United States Patent
Abas et al.

(10) Patent No.: US 10,281,174 B2
(45) Date of Patent: May 7, 2019

(54) THERMOSIPHON SOLAR WATER HEATER USING CO2 AS WORKING FLUID

(71) Applicants: Naeem Abas, Islamabad (PK); Nasrullah Khan, Islamabad (PK); Aun Haider, Sialkot (PK)

(72) Inventors: Naeem Abas, Islamabad (PK); Nasrullah Khan, Islamabad (PK); Aun Haider, Sialkot (PK)

(*) Notice: Subject to any disclaimer, the term of this patent is extended or adjusted under 35 U.S.C. 154(b) by 136 days.

(21) Appl. No.: 15/158,275

(22) Filed: May 18, 2016

(65) Prior Publication Data
US 2017/0336101 A1    Nov. 23, 2017

(51) Int. Cl.
| | |
|---|---|
| F24J 2/44 | (2006.01) |
| F24J 2/34 | (2006.01) |
| F24S 90/10 | (2018.01) |
| F24S 80/20 | (2018.01) |
| F24S 60/30 | (2018.01) |
| F24S 10/40 | (2018.01) |

(52) U.S. Cl.
CPC ............ *F24S 90/10* (2018.05); *F24S 10/45* (2018.05); *F24S 60/30* (2018.05); *F24S 80/20* (2018.05); *Y02E 10/40* (2013.01)

(58) Field of Classification Search
USPC .................................................. 126/638–641
See application file for complete search history.

(56) References Cited

U.S. PATENT DOCUMENTS

| | | | | |
|---|---|---|---|---|
| 2,122,821 | A * | 7/1938 | Mohr .................. | F24J 2/245 122/265 |
| 2,572,935 | A * | 10/1951 | Idle .................... | A47L 15/4217 137/218 |
| 4,069,810 | A * | 1/1978 | Tabor .................. | F24J 2/055 126/638 |
| 2011/0139144 | A1* | 6/2011 | Zheng .................. | F24J 2/32 126/588 |
| 2011/0308249 | A1* | 12/2011 | Mandelberg .......... | F24J 2/42 60/641.15 |
| 2012/0131941 | A1* | 5/2012 | Ackner ................ | F24J 2/055 62/235.1 |
| 2012/0204860 | A1* | 8/2012 | Crawmer .............. | F24J 2/055 126/635 |
| 2012/0247455 | A1* | 10/2012 | Gurin .................. | F24D 11/0221 126/638 |

* cited by examiner

*Primary Examiner* — Avinash Savani
*Assistant Examiner* — Rabeeul Zuberi
(74) *Attorney, Agent, or Firm* — Sarfaraz K. Niazi

(57) ABSTRACT

A gravity driven Thermosiphon solar water heating system to harness solar insolation in low sunshine regions. This innovatory system uses $CO_2$ as the working fluid to collect even mild sunlight to heat the water in sub-zero temperature areas. This solar water heater harnesses solar energy by fitting U-shaped copper heat removal pipes in evacuated glass tubes. This system works automatically by natural thermosiphon circulation force caused by density difference of supercritical $CO_2$ at different temperatures. This innovatory solar water heater can perform in ice cold temperature areas where water based systems cease to function after freezing.

1 Claim, 4 Drawing Sheets

THERMOSIPHON SOLAR WATER HEATER USING CO2 AS WORKING FLUID

BACKGROUND OF THE INVENTION

There is a general consensus that a looming energy crisis by 2050 will lead to serious shortages of fossil fuels. Modeling future energy needs, avoiding global warming are two major challenges we face today. In this scenario, synthetic refrigerants are well known to create global warming and ozone depletion. Around the globe, there are so many populated regions where the ambient temperature drops down to −15° C. or even below. In such regions, hot water is an essential commodity for human life continuity. Millions of Pakistanis face this acute chill of nature in northern regions from Chitral to Skardu.

Growing population, energy crises, greenhouse gas emissions and rising energy demand across the globe have pursued the communities to look for alternative energy resources. According to International Energy Agency (IEA) report, World's 47% of final energy utilization goes for heating which is higher than the final use of energy for power generation (17%) and transportation (27%). The hefty amount of heating energy demand substantially explains the impact of heating demand. To mitigate ozone depletion, the Montreal Protocol (1987) banned the production and use of CFCs after 1995 and HCFC by 2013/2015. Kyoto Protocols in 1997 recommended the complete phasing out of Hydro-CholoroFlouroCarbons (HCFC) by 2015-2020 and Hydro-flourocarbons (HFC) by 2030. F-Gas law in Europe and UK (2015) quest for mediating fluids having zero or low Global warming Potential (GWP). This turns to a new era of environmental benign mediating fluids. Among ASHREA envisaged natural refrigerants, supercritical $CO_2$ emerges as optimum refrigerant for sub-zero temperature areas in the temperature range of −20 to 70° C. as described in our preceding work. (N. Abas et al, carbon conundrum climate change and $CO_2$ utilization. Int. J. of $CO_2$ Utiliz). Supercritical $CO_2$ is chosen as refrigerant in the present invention due to its superior thermo-physical properties as compared to its group ASHREA natural refrigerants class.

The general purpose of the invention is to provide solar heated water for people living in cold regions like Gilgit Baltistan (Pakistan), Fargo N. Dak. (USA) etc. This invention is related to a real problem of solar water heating in low solar irradiance regions of the world. It works by natural thermosiphon effect in $CO_2$ filled evacuated glass tubes arranged in a specific manner. The invented system derives its efficiency from excellent refrigerant properties of compressed $CO_2$ and by fitting specified geometrical U-shaped copper heat removal pipes.

To the best of our knowledge, there is no invention regarding thermosiphon based solar water heater using compressed $CO_2$ as a working fluid. However, some related patents are described below briefly.

U.S. Pat. No. 2010/0319681 A1, published on Dec. 23, 2010 issued to Yangsong Li is about solar water heaters and methods. It describes a system comprising a number of elongated water heating units which can be connected in series and can install vertically or inclined to have maximum exposure to the sun. Each water heating unit can use inner and outer glass tubes which may or may not be a twin glass tube. An inner metal water container has been employed that extends through an opening in inner and outer glass tubes. The system works on the basis of natural water convection. Also, this patent provides us a comprehensive list of previously issued US patents regarding the art of Solar Water Heater. However, all of them do not use compressed carbon dioxide ($CO_2$) as a working fluid for the purpose of heat transfer. Using compressed $CO_2$ as mediating fluid requires high pressure handling capacity of solar water heating system (100 bar or above) whilst the system developed by Yangsong Li used water which works only up to a few bars. Also, our invention employs the evacuated glass tubes leading to claims made in a later section.

U.S. Pat. No. 2009/0313886 A1 issued to Brian L. Hinman and John Henry Stevens discloses a method, apparatus, and system in which products of a solar assisted Reverse Water Gas Shift (RWGS) reaction are used in a hydrocarbon fuel synthesis process to create a liquid hydrocarbon fuel. With the addition of solar energy, a water splitter splits the water molecules into hydrogen and oxygen. Next a chemical reactor chamber is used that mixes solar heated carbon dioxide gas with all or just a portion of the hydrogen from the water splitter component in a RWGS reaction to produce resultant carbon monoxide. Further a hydrocarbon liquid fuel synthesis reactor receives and utilizes either all of the unused hydrogen from RWGS or the left over hydrogen from water splitter and resultant carbon monoxide from RWGS in a hydrocarbon fuel synthesis organic reaction to create a liquid hydrocarbon fuel. The invention presented in this application is not related to the above mentioned patent at all. We do not employ the chemical reaction and neither our aim is to produce hydrocarbon fuels by employing solar assisted chemical reactions. The only thing common is employing of carbon dioxide to absorb solar radiations. Rest two inventions are totally different from each other.

U.S. Pat. No. 2012/0174583 A1 granted to Matthew Alexander Lehar discloses a dual reheat Rankine cycle system and methods thereof. This system incorporates a heater configured to circulate a working fluid in a heat exchange relationship with a hot fluid to vaporize the working fluid. A hot and a cold system are coupled to a heater. The former includes a first heat exchanger configured to circulate a first vaporized stream of the working fluid from the heater. It is being done in a heat exchange relationship with a first condensed stream of the working fluid. The later system includes a second heat exchanger configured to circulate a second vaporized stream of the working fluid from the first system. It is being done in heat exchange relationship with a second condensed stream of the working fluid to heat the second condensed stream of working fluid before feeding it to the heater.

The system described in the above mentioned patent has no relationship with the system described in this application. We do not employ Rankin cycle and dual heat exchanger systems. Our invention is totally novel from the above described patent.

BRIEF SUMMARY OF THE INVENTION

The present invention describes a complete gravity driven evacuated glass tube solar water heater using $CO_2$ as working fluid. Furthermore, this invention is based on the supercritical behavior of $CO_2$ in self-sustained mode, providing the system's nonfreezing ability down to −76.5° C. Natural circulation automatically evolves out of density differences of $CO_2$ in copper tubes at different temperature. Transcritical stage is succeeded by initial filling the system at 68 bar, while temperature gradient is gained inside the evacuated glass tube solar collector. A special designed semi-circle aluminum fin is placed inside the evacuated glass tube to collect the heat from the glass tube to deliver to refrigerant ($CO_2$) carrying copper tubes. The thermosiphon loop consists of Evacuated Glass Tube Solar Collector (EGTSC) with U shaped heat removal tubes as shown in FIG. 1 and drawing in FIG. 2 to FIG. 4. Heat source (EGTSC) is at the lower side and heat sink is elevated on top in the form of water tank as shown in FIG. 1, The heat removal loop has two-dimension geometry, up-rise that drive the heated fluid to condenser where it gives off heat and returned through the down-comer using thermosiphon. The present model has ability to handle high pressure filling and its operation sustainability.

DETAILED DESCRIPTION OF THE INVENTION

Generally, water is widely used as the working fluid in water heating systems but it can only be used above 0° C. When temperature drops to −15 to 25 in cold blizzards and sustained snowfall water inside the solar water heater freezes itself. The $CO_2$ refrigerant has the inherent capability to derive geothermal heat from subsurface (if connected) in the absence of sunshine. Other common working fluids are ammonia and silicon oil in use today for temperate regions. Ammonia is toxic and silicon oil is difficult to handle because of its higher viscosity. They do not exhibit supercritical behavior at low temperature as $CO_2$. Among natural refrigerants, $CO_2$ has a favorable property in terms of heat transfer and thermodynamic characteristics, having a freezing point at −76.5° C. renders it viable for being chosen as natural refrigerant.

Carbon dioxide ($CO_2$) refrigerant easily attains 75° C. during 30 to 35° C. ambient temperatures. When the hot refrigerant is passed through shell-and-coil type counter flow heat exchanger the inlet water temperature increases from 26 to 55° C. giving off temperature gradient of 29° C. The maximum temperature difference in the heat exchanger is 52° C. Solar insolation acts as driving force starting Thermosiphon effect on $CO_2$. This system provides 23° C. greatest temperature difference (GTD), 14° C. lowest temperature difference (LTD) and 18.13° C. log mean temperature difference (LMTD). Special arrangement in manifolds and inside the evacuated tubes makes it possible to stop reverse thermosiphon.

An Evacuated Glass Tube Solar Collector (EGTSC) consisting of 9 glass evacuated tubes with U-shape copper tubes fixed inside the evacuated glass tubes for removal of collected heat. The U shape copper tubes can withstand with supercritical pressure of mediating fluid. The EGTSC is inclined at angle of site latitude (33°) is shown in FIG. 1.

Figure 1:
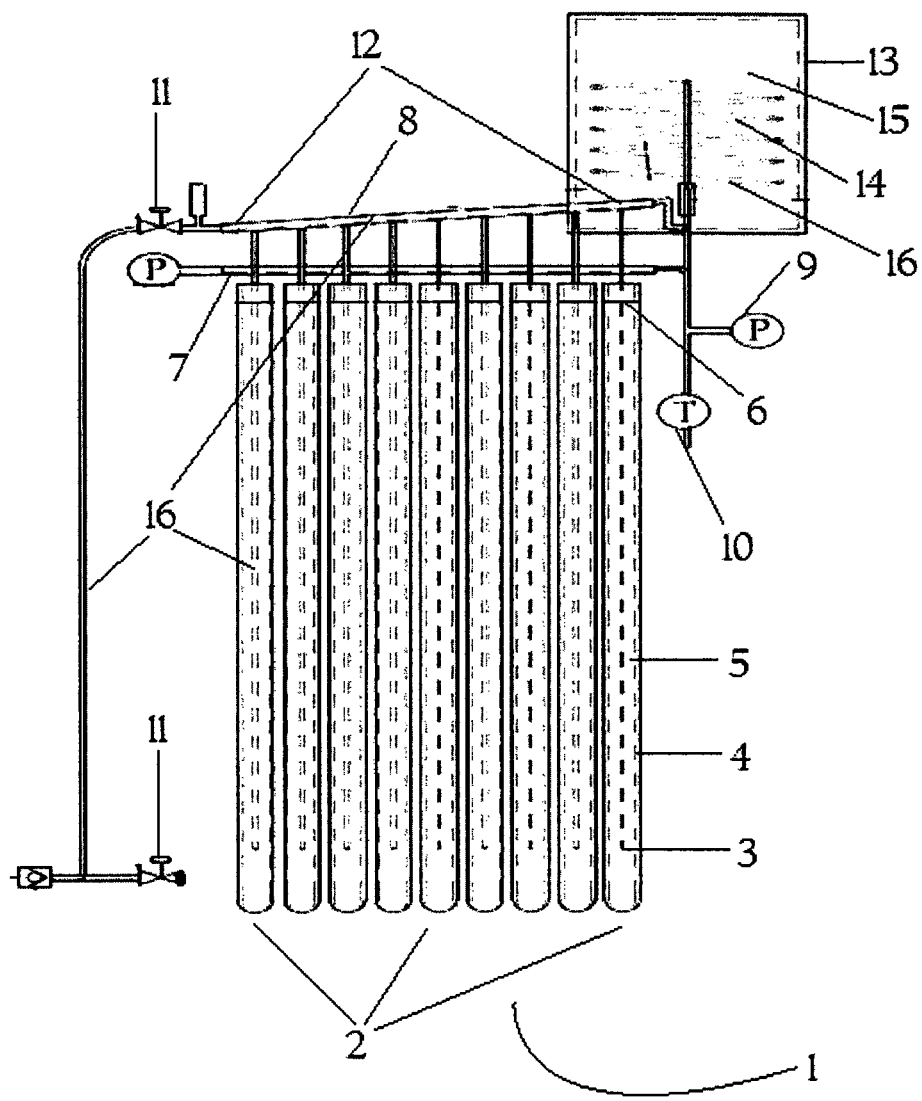
FIG. 1 shows a schematic diagram of Evacuated Glass Tube Solar Water Heater (EGTSWH) 1 using 9 evacuated glass tubes 2 connected in series. U shaped copper tubes 3 are inserted inside the evacuated glass tubes 2 using wooden corks 6. The U shaped copper tubes 3 are enfolded in aluminum foil 4 to act as a fin between evacuated glass tube 2 and U shaped copper tube 3. The U shaped copper tubes 3 are connected with cold header 7 and hot header 8 using stainless steel connectors 21.The U shaped copper tubes 3 are bent inside the evacuated glass tube 2 such that they do not touch each other maintaining a distance 5 among them. The cold header 7 and hot header 8 are made of stainless steel having high pressure bearing capacity i.e. 220 bar. Temperature gauges 10 and pressure gauges 9 are installed on hot header 7, cold header 8, water tank 13, up-riser 17 and down-comer 18. The hot header 8 is inclined at an angle 5-10° to stop reverse thermosiphon during cloudy weather and absence of sunlight. The $CO_2$ 16 is filled through non return valve 11 with cylinder at a pressure of 68 bar or above. The hot header 8 is connected to up-riser 17 which is made of copper tubes through stainless steel connector 21. Up-riser 17 is connected to helical coil heat exchanger 14 which is placed inside water tank 13 using stainless steel connector 21. Down-comer 18 is connected to helical coil heat exchanger 14 from the bottom of water tank 13. Down-comer 18 is further connected to cold header 7 using stainless steel connector 21. This way the circuit of $CO_2$ 16 is completed from solar collector 1 to water tank 13.

The solar water heating system shown in FIG. 1 designed and installed at COMSATS Islamabad, Energy park mainly consist of Heat collection unit (EGTSC) 1, Hot manifold 8 and cold manifolds 7 (hot & cold header), up-riser 17, water tank 13 and down-comer 18. The U shape copper tubes 3, Hot 7 & Cold 8 headers, up-riser 17, helical coil heat exchanger 14 and down-comer 18 are filled with $CO_2$ initially at a pressure of 68 bar or above. The system is also equipped with high pressure filling and discharging system that can withstand up to 220 bar pressure as shown in FIG. 1.

Figure 2:
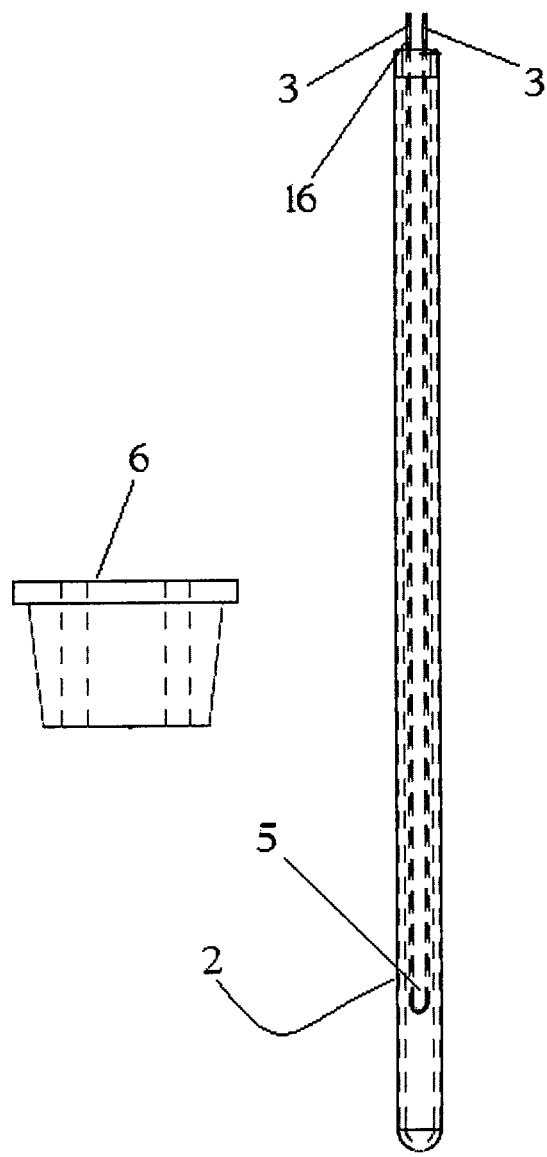
FIG. 2 shows U-shaped copper tube 3 assembled in a single evacuated glass tube 2 using wood cork 6. The Evacuated glass tube has a dimension of length of 1.8 m made of borosilicate glass with an external diameter of 0.0058 m and internal diameter of 0.0047 m. Wood cork 6 holds the U-shaped copper tube 3 and also insulates the evacuated glass tube 2.
Figure 3:
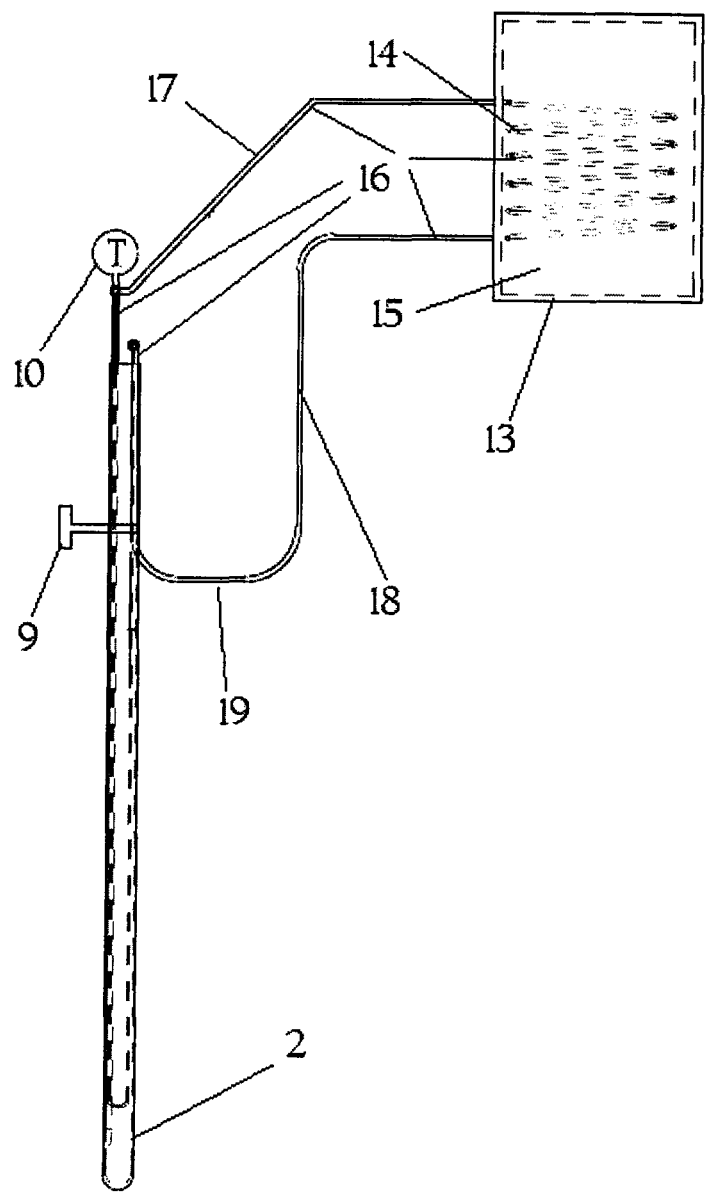
FIG. 3 shows side view of density driven (thermosiphon) EGTSWH. The hot header 8 is connected to up-riser 17 which is elevated at an angle of 45° with respect to hot header 8 and cold header 7. The mediating fluid $CO_2$ 16 is evaporated in presence of solar insolation and travels to the elevated water tank 13 by flowing through copper tubes circuit. In water tank 13 it gives off the collected heat and returns to the solar collector through down-comer 18.

The heat collection unit is composed of borosilicate glass evacuated tubes 2 of 58×47×1800 mm fixed on aluminum stand at an angle of 33°. The solar collector was built by inserting aluminum foil 4 enveloped U-shaped copper tubes 3 of size 6.36 mm (OD), 4.6 mm (ID) in evacuated glass tubes 2 using wooden corks 6. U shaped copper tubes 3 were connected to the upper 8 and lower 7 Stainless Steel headers (SS) of size 800.89×21.5×15.5 mm which was connected to upper 17 and lower baffles 18 of helical coil heat exchanger 14 as shown in FIGS. 2 and 3.

Figure 4:
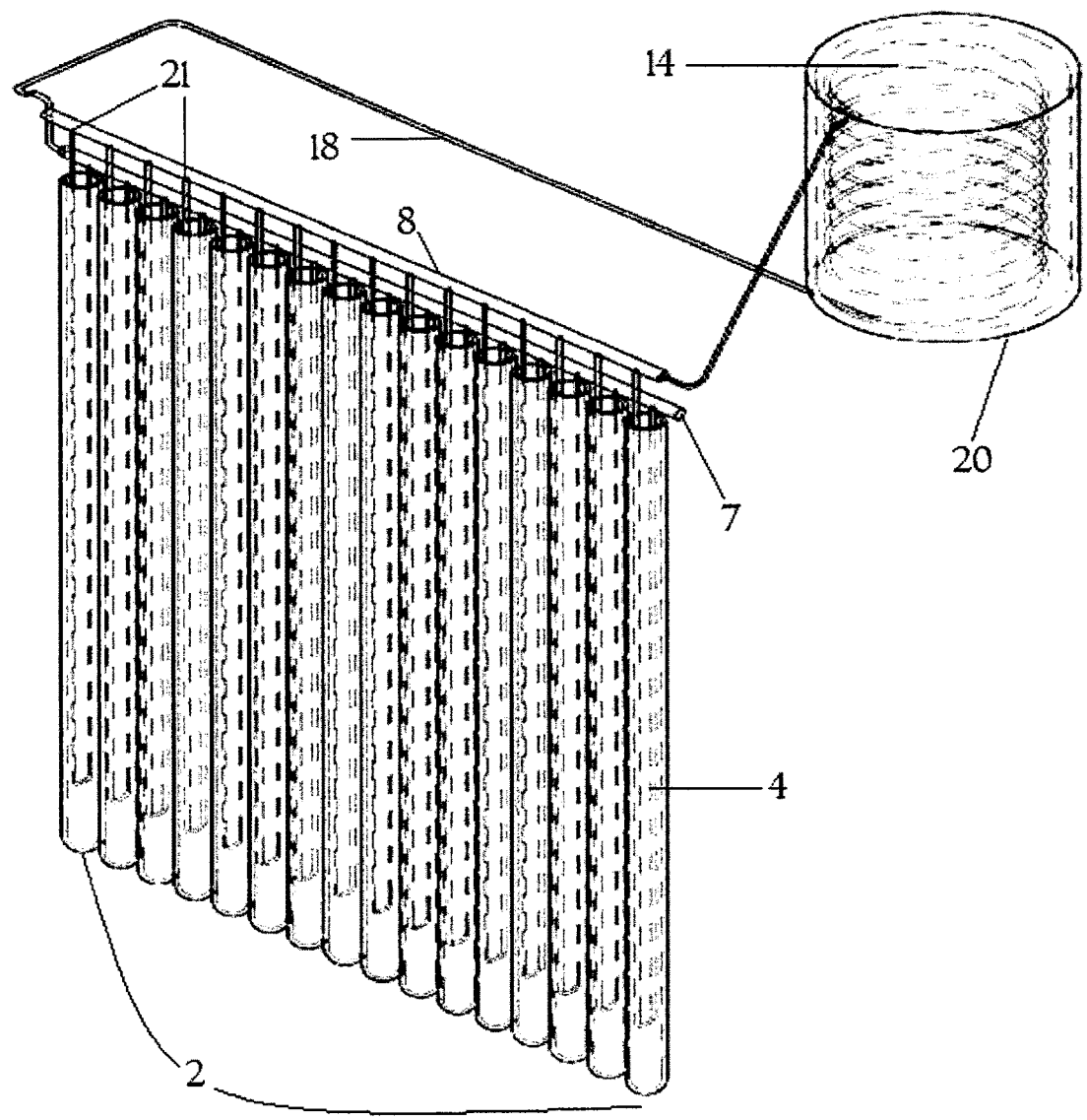
FIG. 4 shows isometric view of the EGTSWH 1 with elevated heat exchanger 14 wrapped in water tank 13. The water tank 13 is filled with fluid water 15 that will be heated by the circulating fluid $CO_2$ 16 in heat exchanger. The elevation of water tank is on upper side of the EGTSWH 1 to support buoyancy forces produced in the mediating fluid i.e. $CO_2$ 16.

Heat collected inside the EGTSC 1 is transferred to water tank 13 elevated above the solar collector through copper tube called up-riser 17 of size 9.25 mm OD. Copper tubes were fitted to stainless steel using argon welding through SS connectors 21. The up-riser 17 has tilted an angle 45° and length 482.6 mm and further 366.6 mm to the water tank 13 as shown in FIG. 4.

A double layer insulated water tank 13 was fabricated using steel materials. The urethane thermal material was wrapped around the internal 23 liter tank 13 holding helical coil 14 for heat transfer. Temperature gauges 10 and pressure gauges 9 were fitted on top side for measuring temperature changes during steady state operation. Pressure and temperature were monitored by analog check gauges fitted to heating fluid and heated water circuits.

What is claimed is:

1. A thermosiphon solar water heater comprising:
a plurality of evacuated double-layer borosilicate glass tubes connected in series disposed at an angle of 33 degrees to ground, further comprising a top opening and a bottom closing, a top plug for the top opening with two holes in the center, a bottom plug for the bottom closing, a single U-shaped copper tube further comprising aluminum fins attached in a circular manner around the U-shaped copper tube and inside the evacuated borosilicate glass tube, further comprising a first end and a second end, wherein both ends are in communication with outside of the glass tube through the two holes in the top plug and wherein the U-shaped copper tube is filled and circulated with compressed carbon dioxide and the glass tube is disposed at an angle equal to the latitude of the level of site of use;

a hot tubular manifold inclined at an angle 5-10 degrees from the horizontal axis and connected to the first end of the U-shaped tube through a pipe;

a cold tubular manifold disposed horizontally and connected along the horizontal axis to the second opening of the U-shaped tube through a pipe;

a heat-insulated tank with an inner volume and capable of holding a volume of water in need for heating;

a helical-shaped copper tubular coil with a top and a bottom opening and disposed vertically inside the heat-insulated tank;

an up-riser stainless steel tube inclined at 45 degrees with respect to the hot manifold connecting the hot tubular manifold to the top end of the helical coil;

a down-comer stainless steel U-shaped tube down-comer disposed horizontally and connecting the lower end of the helical coil to the cold tubular manifold; and, a source of carbon dioxide connected to the hot tubular manifold with a valve and pressure gauge to fill and circulate carbon dioxide under gravity in the U-shaped tube that is maintained at a pressure equivalent of 68 bars at a temperature of $-5C$.

wherein the plurality of glass tubes are used simultaneously.

* * * * *